United States Patent [19]

Ohara

[11] 4,196,874
[45] Apr. 8, 1980

[54] DRIVE APPARATUS FOR TAPE RECORDER

[75] Inventor: Kenji Ohara, Funabashi, Japan

[73] Assignee: Sony Corporation, Tokyo, Japan

[21] Appl. No.: 944,250

[22] Filed: Sep. 21, 1978

[30] Foreign Application Priority Data

Sep. 28, 1977 [JP] Japan ................................ 52-130251[U]

[51] Int. Cl.² ........................................................ G03B 1/04
[52] U.S. Cl. ........................................ 242/201; 360/74.1
[58] Field of Search .............................. 242/200–204, 242/207, 67.4, 191; 74/208, 215, 207; 360/74

[56] References Cited

U.S. PATENT DOCUMENTS

| 2,746,691 | 5/1956 | Hoad | 242/207 X |
| 3,133,710 | 5/1964 | Herterich | 242/201 |
| 3,211,014 | 10/1965 | Sanderson | 74/207 |
| 3,938,758 | 2/1976 | Totino | 242/201 |
| 4,010,918 | 3/1977 | Kato | 242/191 |

FOREIGN PATENT DOCUMENTS

| 43-13046 | 2/1968 | Japan | 242/201 |
| 692891 | 6/1953 | United Kingdom | 242/201 |

OTHER PUBLICATIONS

IBM Technical Disclosure Bulletin, vol. 10, No. 9, Feb. 1968, pp. 1341–1342.

*Primary Examiner*—Leonard D. Christian
*Attorney, Agent, or Firm*—Lewis H. Eslinger; Alvin Sinderbrand

[57] ABSTRACT

In a drive apparatus for a tape recorder which has a pair of spaced apart selectively driven wheels, for example, of supply and take-up reel bases, respectively, a drive wheel located between the driven wheels and adapted to be selectively rotated in forward and reverse directions by means of an electric motor for effecting rotation of an idler wheel which continuously engages the drive wheel, and a pivotally mounted support arm rotatably carrying the idler wheel and being swingable between a first position where the idler wheel bears against one of the driven wheels for driving the latter from the drive wheel and a second position where the idler wheel bears against the other of the driven wheels for driving such other driven wheel from the drive wheel; a magnetic non-contacting coupling is provided between the idler wheel and the support arm so as to yieldably resist relative rotation thereof and thereby cause reliable swinging of the support arm to its first and second positions in response to rotation of the drive wheel in its forward and reverse directions, respectively.

9 Claims, 9 Drawing Figures

DRIVE APPARATUS FOR TAPE RECORDER

BACKGROUND OF THE INVENTION

1. Field of the Invention

This invention relates generally to a drive apparatus for tape recorders, and more particularly is directed to an improved drive apparatus for a tape recorder of the type in which the tape is driven in forward and reverse or rewind directions in response to operation of a drive motor in forward and reverse directions, respectively.

2. Description of the Prior Art

It has been proposed to provide a drive apparatus for a cassette tape recorder having its supply and take-up reels bases provided with respective spaced apart selectively driven wheels, in which the drive apparatus comprises a drive wheel located between the driven wheels and being selectively rotated in first and second opposed rotary directions by means of forward and reverse operation of an electric motor, and an idler wheel engaging the drive wheel so as to be rotated thereby and being rotatably carried by a pivotally mounted support arm which is swingable between a first position where the idler wheel bears against one of the driven wheels for driving the latter from the drive wheel and a second position where the idler wheel bears against the other of the driven wheels for driving such other driven wheel from the drive wheel. In the foregoing previously proposed drive apparatus, automatic change-over of the pivotally mounted support arm between its first and second positions is achieved in response to forward and reverse operation of the drive motor by providing a pad of felt or other friction material between the idler wheel and the support arm for frictionally resisting rotation of the idler wheel. The frictional resistance to rotation of the idler wheel by the drive wheel gives rise to a force which urges the pivoted support arm to move in the direction of movement of the drive wheel surface at its line of contact with the idler wheel.

However, the above described pad of felt or other friction material for causing the automatic change-over of the position of the support arm in response to a change in the direction of operation of the drive motor is not wholly reliable in that the frictional characteristic of the felt and the dimensions of the pad or washer formed thereof cannot be maintained precisely uniform, particularly under the requirements of mass production. Therefore, frictional resistance to rotation of the idler wheel relative to its support arm is not uniform and may vary from one drive apparatus to the next or with the passage of time or changes in external conditions. As a result of the foregoing, the load on the drive motor may vary and the reliability of automatic change-over of the tape driving direction is adversely affected, particularly after long periods of operation.

OBJECTS AND SUMMARY OF THE INVENTION

Accordingly, it is an object of the present invention to provide a drive apparatus for a tape recorder which is free of the above-mentioned disadvantages or defects encountered in the prior art.

More particularly, it is an object of this invention to provide a drive apparatus for a tape recorder which is capable of reliably and consistently effecting a change-over in the direction of tape drive in response to a change in the direction of operation of the drive motor.

Another object is to provide a drive apparatus for a tape recorder, as aforesaid, which is suitable for mass production, and in which the automatic change-over of the direction of tape drive in response to the change in the direction of operation of the drive motor is not adversely affected by either long use of the tape recorder or its operating conditions.

In accordance with an aspect of the invention, in a drive apparatus for a tape recorder which comprises a pair of spaced apart selectively driven wheels, for example, of the supply and take-up reel bases, a drive wheel located between such driven wheels and adapted to be selectively rotated in forward and reverse directions by means of an electric motor for correspondingly rotating an idler wheel engaged with the drive wheel, and a pivotally mounted support arm rotatably carrying the idler wheel and being swingable between a first position where the idler wheel bears against one of the driven wheels for driving the latter from the drive wheel and a second position where the idler wheel bears against the other of the driven wheels for driving such other driven wheel from the drive wheel; a magnetic, non-contacting means magnetically couples the idler wheel with the support arm so as to yieldably resist relative rotation thereof and thereby cause swinging of the support arm to its first and second positions in response to rotation of the drive wheel in the forward and reverse directions, respectively.

The above, and other objects, features and advantages of the invention, will be apparent in the following detailed description of illustrative embodiments which is to be read in connection with the accompanying drawings forming a part hereof.

DESCRIPTION OF THE PREFERRED EMBODIMENTS

Figure 1A:
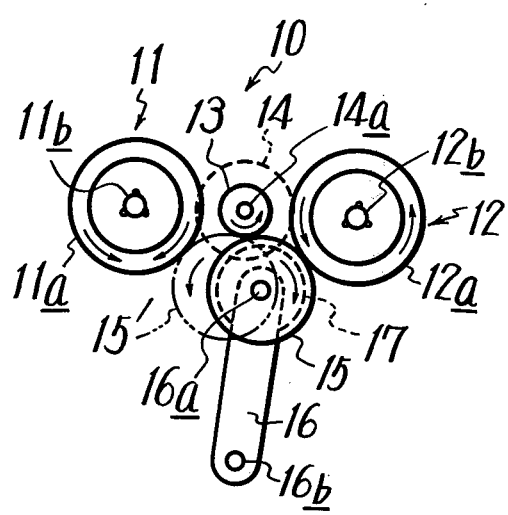
FIG. 1A is a schematic plan view illustrating essential parts of a drive apparatus for a cassette tape recorder according to the prior art.
Figure 1B:
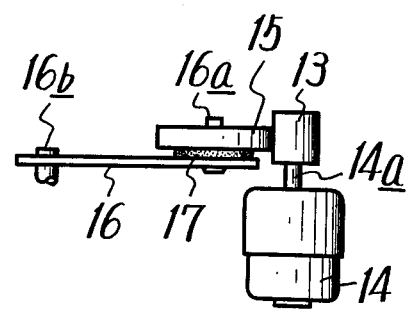
FIG. 1B is a side elevational view of a portion of the prior art drive apparatus.

Referring to the drawings in detail, and initially to FIGS. 1A and 1B thereof, it will be seen that, in a prior art drive apparatus 10 for a tape recorder of the type to which the present invention relates, supply and take-up reel bases 11 and 12 are spaced apart so as to be respectively engageable with the supply and take-up reels (not shown) of a tape cassette. The supply and take-up reel bases 11 and 12 are shown to have selectively driven wheels 11a and 12a which are suitably coupled with reel shafts 11b and 12b, respectively. A drive wheel 13 is located between parallel planes passing through the axes of driven wheels 11a and 12a and is adapted to be selectively rotated in the clockwise and counter-clockwise directions, as viewed on FIG. 1A, by means of a reversible DC motor 14 having drive wheel 13 directly secured on its motor shaft 14a. An idler wheel 15 is in peripheral engagement with drive wheel 13 so as to be rotated thereby about a shaft 16a mounted adjacent one end of a support arm 16 which is pivotally mounted, at its opposite end portion, on a pivot pin 16b. It will be apparent that the pivotally mounted support arm 16 is swingable between a first position shown on FIG. 1A and in which idler wheel 15 bears against driven wheel 12a for driving the latter from drive wheel 13, and another or second position in which idler wheel 15 bears against the other driven wheel 11a, for example, as indicated in broken lines at 15', for driving driven wheel 11a from drive wheel 13.

In the drive apparatus 10 for a cassette tape recorder according to the prior art, as illustrated on FIGS. 1A and 1B, it is intended that idler wheel 15 should be disposed in the position shown in full lines on FIG. 1A when drive wheel 13 is rotated in the counter-clockwise direction by motor 14, thereby to drive driven wheel 12a and the respective take-up reel base 12 in the counter-clockwise direction, for example, as in the fast-forward mode of operation of the cassette tape recorder. On the other hand, it is desired that, when the voltage applied to motor 14 has its polarity reversed so as to rotate drive wheel 13 in the reverse or clockwise direction, it is desired that idler wheel 15 should be automatically changed-over from the position shown in full lines on FIG. 1A to the position indicated in broken lines at 15', whereupon driven wheel 11a and the respective supply reel base 11 are rotated in the clockwise direction, for example, as in the rewind mode of operation of the cassette tape recorder.

In order to effect such automatic change-over of the position of idler wheel 15 in response to reversal of the direction of rotation of drive wheel 13, the illustrated drive apparatus 10 according to the prior art further includes a pad or washer 17 of felt or other similar friction material extending around shaft 16a between idler wheel 15 and support arm 16 so as to frictionally resist rotation of idler wheel 15 relative to its support arm 16. Such frictional resistance of felt washer 17 to rotation of idler wheel 15 by drive wheel 13 gives rise to a force which urges the pivoted support arm 16 to move in the direction of movement of the surface of drive wheel 13 at its line of contact with idler wheel 15. Thus, when drive wheel 13 is rotated in the counterclockwise direction, as indicated by the arrow on FIG. 1A, the frictional resistance to rotation of idler wheel 15 relative to arm 16 gives rise to a force acting in the right-ward direction on support arm 16 for disposing the latter in the position shown in full lines where idler wheel 15 bears against driven wheel 12a for rotating the latter from drive wheel 13. On the other hand, when the direction of rotation of drive wheel 13 is reversed so as to be in the clockwise direction, as viewed on FIG. 1A, the frictional resistance to rotation of idler wheel 15 gives rise to a force acting in the left-ward direction on support arm 16 so that the latter is swingably displaced to dispose the idler wheel at the position shown in broken lines at 15', that is, bearing against driven wheel 11a for rotating the latter in the clockwise direction from drive wheel 13.

However, the above-described pad or washer 17 of felt used in the prior art for causing automatic change-over of the position of support arm 16 in response to change-over of the direction of operation of motor 14 is not wholly reliable or consistent in that the frictional characteristics of the felt and the dimensions of the pad or washer 17 formed thereof cannot be maintained precisely uniform, particularly under the requirements of mass production and, therefore, frictional resistance to rotation of idler wheel 15 may vary from one drive apparatus to the next or with the passage of time or changes in external conditions.

Generally, such problem in the drive apparatus of the prior art is solved by providing a magnetic, non-contact means for yieldably resisting rotation of the idler wheel. More particularly, reference to FIGS. 2 and 3, will show that, in a drive apparatus 20 for a tape recorder according to the present invention, as there illustrated, there are once again provided supply and take-up reel bases 21 and 22 which have respective, laterally spaced apart shafts 23 and 24 extending upwardly from a chassis 25. The supply and take-up reel bases 21 and 22 further include driven wheels 26 and 27 rotatable on the respective shafts 23 and 24 and formed with upwardly directed sleeves on which reel-engaging elements 26a and 27a are axially slidable and urged upwardly, as by the helical spring 28 appearing on FIG. 3. As is well-known, the reel engaging elements 26a and 27a are adapted to rotatably couple the hubs of supply and take-up reels in a tape cassette with wheels 26 and 27 of the respective supply and take-up reel bases 21 and 22.

Figure 2:
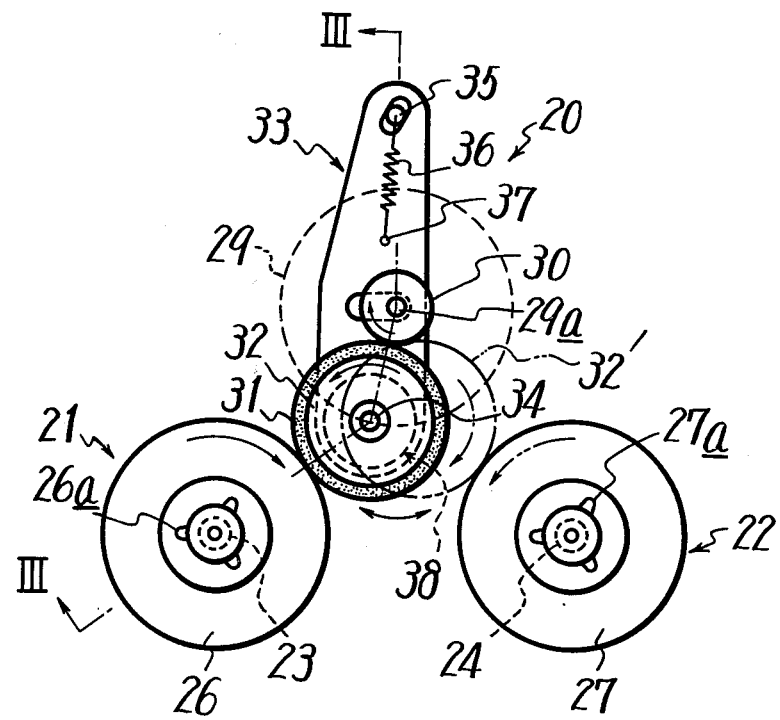
FIG. 2 is an enlarged, schematic plan view of a drive apparatus for a cassette tape recorder in accordance with an embodiment of the present invention.
Figure 3:
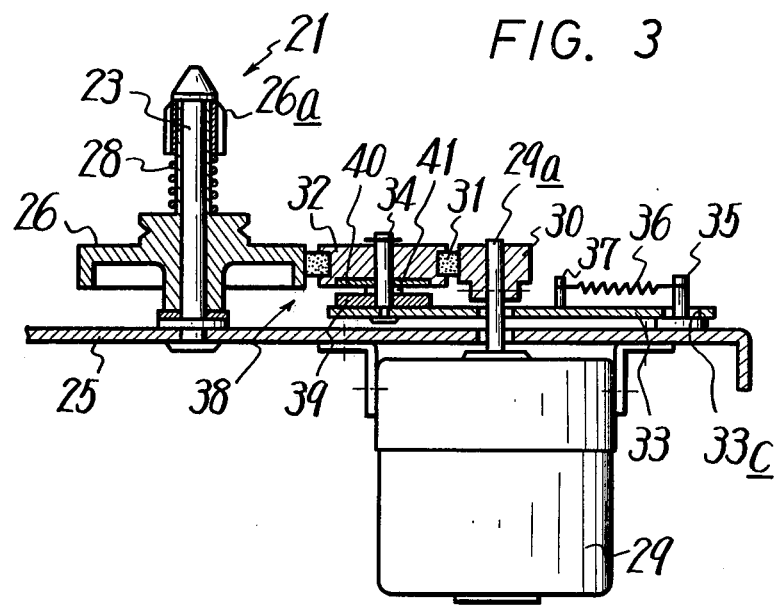
FIG. 3 is an enlarged sectional view taken along the line III—III on FIG. 2.
Figure 4:
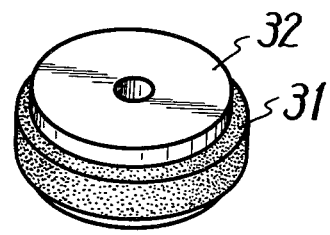
FIGS. 4–7 are detail perspective views illustrating elements included in the drive apparatus of FIGS. 2 and 3.
Figure 5:
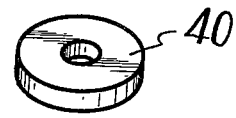
Figure 7:
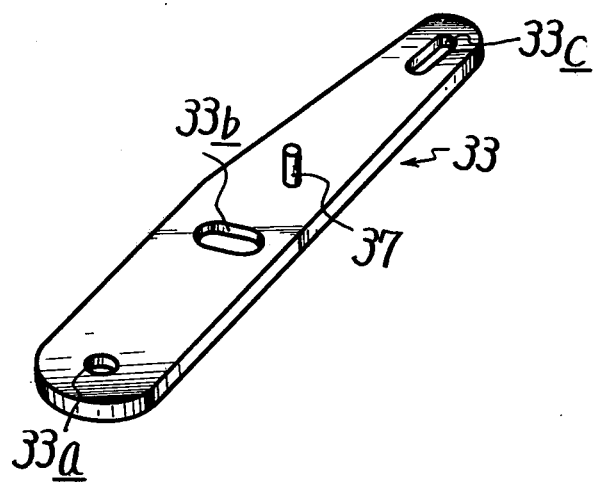

A motor 29 is suitably mounted below chassis 25 and has its motor shaft 29a directed upwardly through an opening in the chassis and located between parallel planes passing through the axes of driven wheels 26 and 27. A drive wheel 30 is suitably secured on motor shaft 29a above chassis 25 and is in rolling engagement with a rubber tire or rim 31 provided on the periphery of an idler wheel 32 (FIG. 4) which is rotatably supported by a support arm 33. As shown particularly on FIG. 7, support arm 33 may have a bore 33a at one end in which a shaft 34 (FIG. 2) is fixed for rotatably mounting idler wheel 32 on support arm 33. Intermediate its ends, support arm 33 is formed with a laterally elongated slot 33b through which motor shaft 29a can loosely extend while avoiding interference with lateral swinging movement of arm 33. Finally, for pivotally mounting arm 33, the end portion of the latter remote from idler wheel 32 is formed with a longitudinally elongated slot 33c which slidably receives a pivot pin 35 extending upwardly from chassis 25 (FIGS. 2 and 3). A tension spring 36 extends between pivot pin 35 and an anchor 37 provided on support arm 33 between slots 33b and 33c. Thus, tension spring 36 urges arm 33 longitudinally in the direction for maintaining engagement of tire or rim 31 of idler wheel 32 against the peripheral surface of drive wheel 30.

Figure 6:
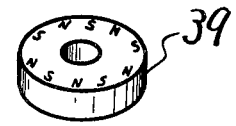

As in the drive apparatus 10 according to the prior art, in the drive apparatus 20 embodying the present invention, the support arm 33 is swingably displaced about its pivot pin 35 in response to a change in the direction of rotation of drive wheel 30. More particularly, upon change in the rotation of wheel 30 from the clockwise direction to the counter-clockwise direction, idler wheel 31 is moved from the position shown in full lines on FIG. 2, where it bears against driven wheel 26 for rotating the latter from drive wheel 30, to the position indicated in broken lines at 32' on FIG. 2, where the idler wheel bears against the periphery of driven wheel 27 for rotating the latter from drive wheel 30. The foregoing change-over of the positions of idler wheel 32 and its support arm 33 again arises as a result of yieldable resistance to the rotation of idler wheel 32 relative to support arm 33. However, in accordance with the present invention, the yieldable resistance to rotation of idler wheel 32 is provided by magnetic non-contact coupling means identified generally by the reference numeral 38 on FIG. 3. Such magnetic, non-contact coupling means 38 is shown to comprise a magnet 39 (FIGS. 3 and 6) in the form of an annulus, for example, of ferrite, which is suitably secured, as by adhesive, to the upper surface of support arm 33 around shaft 34, and an annulus 40 of a magnetic or hysteresis material having substantially the same outer diameter as magnet 39 and being securely embedded in a corresponding recess formed in the lower surface of idler wheel 32, as shown on FIG. 3. Thus, magnet 39 and annulus 40 have faces which confront each other in the axial direction. The magnetic, non-contact coupling means 38 employed for resisting rotation of idler wheel 32 according to this invention further preferably includes a spacer 41 of suitable thickness extending around shaft 34 between magnet 39 and annulus 40 for suitably spacing apart their confronting faces and thereby obtaining the desired yieldable resistance to rotation of the idler wheel. As shown particularly on FIG. 6, the annular magnet 39 is preferably magnetized in the circumferential direction so as to provide at least one pair, and preferably a plurality of pairs of magnetic poles at the face of magnet 39 which confronts the face of annulus 40.

It will be apparent that, if the magnetic resistance to relative turning of annulus 40 with idler wheel 32 in respect to magnet 39 secured on arm 33 is selected at a suitable value, the resulting force acting on arm 33 in one direction or the other depending on the direction of rotation of motor shaft 29a, will be constant. Thus, arm 33 is reliably displaced in dependence on the direction of rotation of motor shaft 29a to engage the rim 31 of idler wheel 32 with either driven wheel 26 or driven wheel 27, for example, so as to establish either the rewind mode of operation or the fast-forward mode of operation, respectively, of the cassette tape recorder. Since the coupling means 38 for yieldably resisting relative rotation of idler wheel 32 and support arm 33 is of the non-contact magnetic type, the previously described disadvantages of, and problems associated with the felt washer 17 employed in the prior art drive apparatus 10 are all avoided. More particularly, the yieldable resistance to rotation of idler wheel 32 provided by magnetic non-contact coupling means 38 does not vary with time or by reason of surrounding conditions and, therefore, the automatic change-over from engagement of idler wheel 32 with driven wheel 26 to engagement with driven wheel 27 is carried out positively and reliably in response to change in the direction of rotation of motor shaft 29a. Furthermore, since the yieldable resistance to rotation of idler wheel 32 is constant, no change occurs in the loading of motor 29. The non-contact magnetic coupling means 38 for resisting relative rotation can also be readily mass produced so as to have uniform characteristics.

Figure 8:
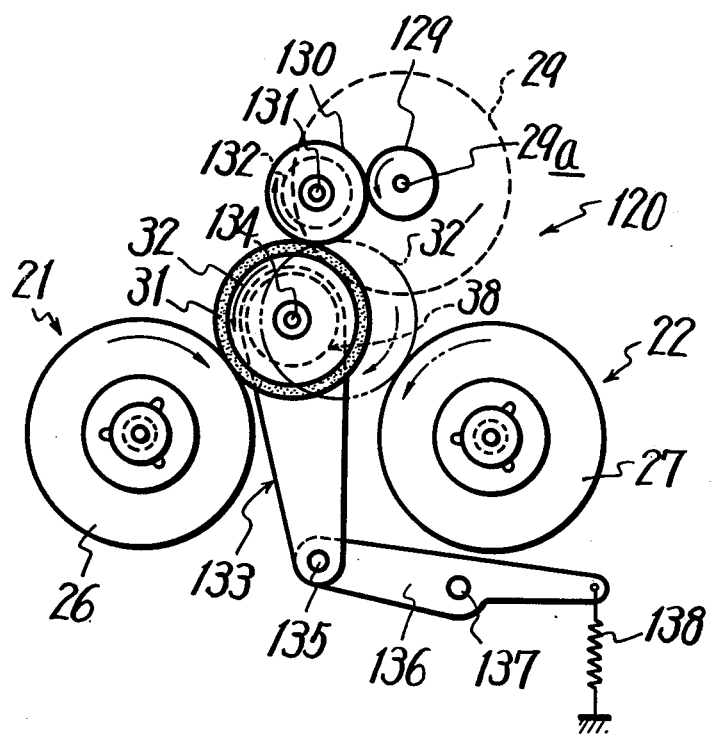
FIG. 8 is a view similar to that of FIG. 2, but illustrating another embodiment of the invention.

In the embodiment of the present invention described above with reference to FIGS. 2 and 3, the drive wheel 30 which continuously engages rim 31 of idler wheel 32 is shown to be directly secured on shaft 29a of drive motor 29. However, as shown on FIG. 8, the present invention may also be applied to a drive apparatus 120 for a tape recorder which is of the type incorporating a torque limiter for absorbing an increase in the load on the drive motor when the tape is completely unwound from the supply reel or from the take-up reel at the completion of a fast-forward or rewind operation, respectively, of the tape recorder. More particularly, in the drive apparatus 120 shown on FIG. 8, in which elements corresponding to those described above with reference to FIGS. 2 and 3 are identified by the same reference numerals, the shaft 29a of drive motor 29 has a drive roller 129 secured thereon and engaging a drive wheel 130 which is in the form of an intermediate idler rotatable about a shaft 131 and incorporating a conventional torque limiter 132. Thus, in the drive apparatus 120, the peripheral rim 31 of idler wheel 32 is continuously engaged with drive wheel 130 which is driven through roller 129 from motor 29, and the torque limiter 132 limits the load that can be placed on the motor 29. The idler wheel 32 is shown to be rotatable on a shaft 134 carried by a support arm 133, and a magnetic non-contact coupling means 38 is provided, as previously described, for yieldably resisting rotation of idler wheel 32 relative to its support arm 133. Thus, changing the direction of rotation of drive roller 129 and, hence, of drive wheel 130, automatically changes-over idler wheel 32 from the position shown in full lines for rotating driven wheel 26 from drive wheel 130 to the position shown in broken lines at 32' for rotating driven wheel 27 from drive wheel 130.

Further, in drive apparatus 120 the continuous contact of the rim 31 of idler wheel 32 with drive wheel 130 is maintained by pivotally mounting support arm 133 on a pivot pin 135 at one end of a lever 136. The lever 136 is pivotally mounted at 137 and a spring 138 acts on lever 136 to rock the same in the clockwise direction, as viewed on FIG. 8, that is, in the direction pressing idler wheel 32 against drive wheel 130.

It will be apparent that drive apparatus 120 acts substantially in the same manner as the previously described drive apparatus 20 for automatically and reliably changing-over the position of idler wheel 32 in response to changing of the direction of rotation of motor shaft 29a.

It will be appreciated that the embodiments of the invention described above with reference to FIGS. 2 and 3 and FIG. 8, respectively, involve the change-over of the position of idler wheel 32 for establishing the fast-forward and rewind modes of operation of the tape recorder in response to changes in the direction of rotation of the motor shaft. However, the invention can be similarly applied with the advantages previously described for effecting a change in the direction of tape movement in a tape recorder of the type in which the tape may be driven at the normal speed for recording and reproducing both in the forward and reverse directions.

Furthermore, in the illustrated embodiment of the invention, the driven wheels 26 and 27, idler wheel 32, drive wheel 30 or 130 and drive roller 129 are all shown to have smooth peripheries which transmit forces by frictional contact with each other, as previously described. However, it will be apparent that such driven, idler and drive wheels and drive roller could be formed with toothed peripheries to transmit the requisite forces by meshing engagement.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A drive apparatus for a tape recorder, comprising:
a pair of spaced apart selectively driven wheels;
a motor;
a drive wheel located between parallel planes passing through the axes of said driven wheels and adapted to be selectively rotated in first and second opposed rotary directions by means of said motor;
an idler wheel engaging said drive wheel so as to be rotated thereby;
a pivotally mounted support arm rotatably carrying said idler wheel and being swingable between a first position where said idler wheel bears against one of said driven wheels for driving the latter from said drive wheel and a second position where said idler wheel bears against the other of said driven wheels for driving said other driven wheel from said drive wheel;
and non-contacting magnetic means including at least one coupling member spaced apart from said idler wheel for magnetically coupling said idler wheel with said support arm so as to yieldably resist relative rotation thereof and thereby cause swinging of said support arm to said first and second positions in response to rotation of said drive wheel in said first and second rotary directions, respectively.

2. A drive apparatus for a tape recorder according to claim 1; in which said motor has a shaft, and said drive wheel is secured directly on said shaft of the motor.

3. A drive apparatus for a tape recorder according to claim 1; in which said motor has a shaft with a drive roller thereon, and said drive wheel is engaged with said drive roller so as to be driven through the latter from said motor.

4. A drive apparatus for a tape recorder according to claim 1; further comprising spring means urging said support arm in a direction for maintaining the engagement of said idler wheel with said drive wheel.

5. A drive apparatus for a tape recorder according to claim 4; which further includes a fixed pivot pin, an elongated slot in said support arm extending generally in said direction for maintaining engagement and for receiving said fixed pivot pin for the mounting of said support arm, and said spring means is connected between said pivot pin and said support arm.

6. A drive apparatus for a tape recorder according to claim 4; which further includes a lever on which said support arm is pivotally mounted, said lever being rockable for movement of said support arm in said direction for maintaining engagement and said spring means being connected to said rockable lever.

7. A drive apparatus for a tape recorder according to claim 1; in which said magnetic means includes first and second coupling members secured to said support arm and said idler wheel, respectively, one of said coupling members being constituted by a magnet, and the other of said coupling members being of a magnetic material.

8. A drive apparatus for a tape recorder according to claim 7; in which said coupling members are annular and have confronting faces, and said one coupling member has at least one pair of magnetic poles at the respective one of said contronting faces.

9. A drive apparatus for a tape recorder according to claim 8; wherein said first and second coupling members are spaced apart by a spacer interposed between said first and second coupling members for maintaining said confronting faces in spaced relation.

* * * * *